United States Patent

Nagashima et al.

[11] 3,803,860
[45] Apr. 16, 1974

[54] FREEZE PROCESS FOR MAKING FRESH WATER FROM BRINE

[75] Inventors: Yoshinori Nagashima; Keizo Hayashi; Mamoru Inoue; Takai Yamazaki; Shinichi Maeda, all of Okayama; Shigetake Kawasaki, Kanagawa; Masaru Owa, Tokyo, all of Japan

[73] Assignee: Mitsui Shipbuilding and Engineering Co., Ltd., Tokyo, Japan

[22] Filed: Apr. 25, 1972

[21] Appl. No.: 247,289

[30] Foreign Application Priority Data
May 22, 1971  Japan.............................. 46-35066

[52] U.S. Cl. ................................................ 62/58
[51] Int. Cl. ............................................ B01d 9/04
[58] Field of Search ............................... 62/58, 123

[56] References Cited
UNITED STATES PATENTS
3,342,039  9/1967  Bridge et al. ..................... 62/123
3,425,235  2/1969  Cox...................................... 62/58
3,614,874  10/1971  Martindale et al. ............... 62/58 X Primary Examiner—Meyer Perlin
Assistant Examiner—Ronald C. Capossela
Attorney, Agent, or Firm—Karl W. Flocks

[57] ABSTRACT

A process for making fresh water from brine by freezing the brine and an apparatus for practicing said process, in which feed brine is fed into a crystallization tank, together with a recycle of brine and a return flow of brine from a washing tower, and contacted by a refrigerant, whereby ice particles are formed, and said ice particles are washed in the washing tower with a recycle of production fresh water and melted in a melting tank (melter) by the circulating vapor refrigerant, and the resultant fresh water is ridden of the refrigerant in a deaerator and an absorber and discharged as the product fresh water, while the refrigerant removed from the fresh water is recycled for reuse, said crystallization tank being provided therein with a plurality of baffle plates arranged in the longitudinal direction in spaced relation to be submerged below the liquid level so that the condition may be created in said crystallization tank, in which the brine moves in the fashion of a piston flow and the ice particles move while being mixed with the brine in a state intermediate of piston flow and perfect mixing by its density.

1 Claim, 1 Drawing Figure

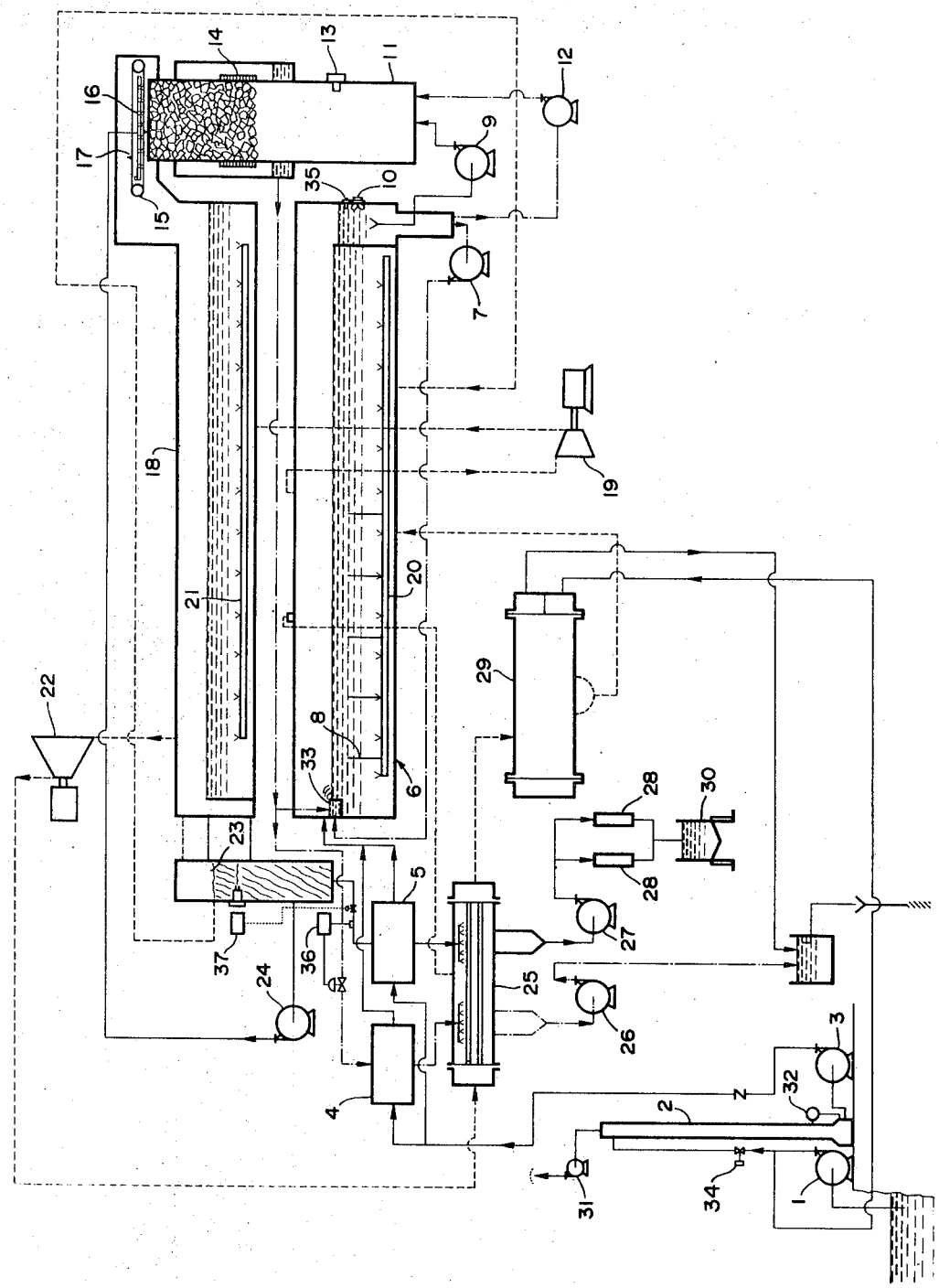

FREEZE PROCESS FOR MAKING FRESH WATER FROM BRINE

BACKGROUND OF THE INVENTION

1. Field of the Invention

This invention relates to a freeze process for making water and an apparatus used therefor, and more particularly to a process for making fresh water by freezing brine and an apparatus used for practicing said process.

2. Description of the Prior Art

Various processes have been proposed for making fresh water from brine. For instance, there has been proposed a process in which brine is refrigerated to form ice crystals and fresh water is made from these ice crystals. This process, however, is complicated because the unit operation involves handling of a heterogeneous fluid, and the operation of the process in a larger scale has to resort to the intuition (say designer's judgement), rather than technical data because no method has been established for controlling the operation. As a result, the automatization of the process is hampered and the labor cost occupies a large percentage in the total fresh water production cost. There has also been proposed a process in which brine is directly contacted with a secondary refrigerant to form ice crystals, but the development of an industrially useful apparatus for this process has not been met with a successful result. All of these facts are attributable to the fact that any of the conventionally proposed processes has been too ideal or in disregard of the actual phenomena.

SUMMARY OF THE INVENTION

The present invention proposes a process which enables fresh water to be contained from brine at a low cost with only a supply of electric power, and also discloses various apparatus for effectively practicing such novel process.

The process according to the present invention comprises subjecting brine to deaeration, preliminary cooling the deaerated brine to the neighbour of 0°C, feeding the cooled brine to a crystallization tank together with a recycle of brine and a return flow of brine from a washing tower, contacting the brine directly with a refrigerant in said crystallization tank thereby to form ice particles, introducing said ice particles into the washing tower wherein the ice particles are separated from the brine, introducing the washed ice particles into a melting tank to melt them into fresh water by direct contact with the heated refrigerant, then separating the fresh water from the refrigerant in a settling tank, and passing the fresh water through a deaerator and, if necessary, through an adsorber to further remove the refrigerant substantially completely from said fresh water thereby to obtain the production fresh water.

The crystallization tank used in practicing the process of this invention is preferably of the type which comprises in combination a horizontally lying main body having an inlet port for feed brine, an inlet port for a recycle of brine and an inlet port for a return flow of brine from the washing tower at its inlet end and a number of refrigerant injection ports at its bottom and further provided therein with a plurality of baffle plates arranged in the longitudinal direction in spaced relation to be submerged below the liquid level; and a pump for circulating the brine from the outlet end to the inlet end of said main body.

The melting tank used in practicing the process of this invention is preferably of the type which comprises a horizontally lying main body having a number of refrigerant vapour injection ports at the bottom thereof and arranged above the main body of the crystallization tank.

The washing tower used in the present invention is preferably of the type which comprises a vertical extending main body and ice scraper means arranged at the top end of said main body with its ice discharge end extending into the upper portion of an ice inlet opening of the melting tank, said ice scraper means consisting of an endless belt and ice scraper blades mounted on the surface of said endless belt.

The present invention will be described in greater detail hereunder with reference to an embodiment thereof shown in the accompanying drawing.

BRIEF DESCRIPTION OF THE DRAWING

The drawing is a process diagram schematically showing an embodiment of the freeze process for making water according to the present invention. In the drawing, the solid lines indicate flows of feed brine, ice particles and fresh water, the alternate long and short dash lines indicate flows of brine and the broken lines indicate flows of a refrigerant.

DESCRIPTION OF THE PREFERRED EMBODIMENT

With reference to the drawing, a feed brine is pumped up by a pump 1. A portion of the pumped brine is led to the top of a deaeration tower 2 through an electromagnetic valve 34 and the remaining portion thereof is led to an auxiliary condenser 29 to be used for condensation and liquefaction of a refrigerant as will be described later. The deaeration tower 2 may be of a known construction but must be made of a brine-resisting material. At the bottom of the deaeration tower 2 is provided a water level regulator 32 which is set such that the electromagnetic valve 34 may be closed when the water level has reached its highest level and the brine feed pump 3 may be stopped when the water level has reached its lowest level.

The brine pumping facility described above is usually located at the seaside and where there is a substantial distance between said facility and a fresh water-making plant to be described later, pressure-resisting, explosion-proof parts need not be used for electric systems even when a hydrocarbon such as butane is used as the refrigerant in the fresh water-making plant.

The brine deaerated in the deaeration tower 2 is pressurized by the feed pump 3 and led into precoolers 4 and 5 upon being diverged into two lines. In these precoolers 4 and 5, the brine is cooled to near the freezing point by the production fresh water and brine being discharged to the outside of the system.

The temperature of the feed brine admitted in a crystallization tank 6 has a great influence on the operational cost of the plant and if attempt is made to lower the brine temperature, the heat transfer area of the plant as a heat exchanger will increase adding to the facility cost. It has been found that, for reducing the production cost of fresh water, it is advantageous to limit the precooling temperature of brine to about 0°C.

The feed brine led to the crystallization tank 6 is introduced into said tank together with other recycle of brine and a return flow of brine from a washing tower. In this case, the brine is caused to overflow a lagging frame 33 provided at the inlet end of said tank, before it drops into an ice-making portion, so as to equalize the flow of brine in said tank.

In the ice-making portion of the crystallization tank 6, bubbles of the refrigerant from the auxiliary condenser 29 which is self-evaporating due to the pressure drop between said auxiliary condenser 29 and said crystallization tank, and bubbles of the refrigerator from the auxiliary condenser 29 and a melting tank 18 to be described later, which is gasified upon direct contact with the brine, are rising while stirring and mixing the brine and ice crystals formed in said ice-making portion.

In such a case, a liquid (brine) and a solid (ice particles) flowing in the longitudinal direction of a tank are usually at a mixing ratio intermediate of perfect mixing and piston flow. However, when baffle plates 8 are provided about 100 mm below the liquid surface, according to the present invention, perfect mixing of the liquid and solid can be achieved between the adjacent baffle plates by the stirring action of the refrigerant bubbles. According to the experiment conducted by the present inventors, the interval of the baffle plates suitable for achieving the perfect mixing is from 1,500 to 2,000 mm.

The phenomenon in which a mixture is perfectly mixed in each of a multiple stages of sections defined by baffle plates and, as a whole, flows in the fashion of a piston flow, as described above, is already known. In the present invention, however, the influence of the baffle plates on the ice particles which are smaller in specific gravity than the brine is minimized by locating the upper ends of said baffle plates about 100 mm below the liquid surface, and furthermore the mode of flow of the ice particles is different from that of the brine since the ice particle has a greater buoyancy as its particle size increases and, after all, the ice particle of a larger size arrives more quickly at the outlet end of the tank.

In other words, while the brine flows in the fashion of a piston flow as a whole over the multi-stages of the perfect mixing sections, the ice particles having grown to some extent are in a state intermediate of the perfect mixing and piston flow in the crystallization tank 6. Therefore, the average residence time of the ice particles in the crystallization tank 6 tends to be shorter than that of the brine and this tendency is more apparent for the ice particles of larger sizes as they have greater buoyancies.

A conventional crystallization tank of this type has been so designed as to achieve perfect mixing but the average residence time of ice particles has been so longer than that of the brine that continuous operation of the tank over an extended period of time has been impossible due to an increasing hold-up of ice particles in said tank. Such disadvantage of the conventional crystallization tank can be eliminated according to the present invention.

In the present invention the depth of the liquid in the crystallization tank is maintained from 600 to 1,000 mm and should not be changed even if the scale of the tank is increased. If the depth is increased, the evaporation temperature of the refrigerant will rise to a level unsuitable for making ice, due to a pressure increase caused by the liquid column. Namely, in practice, the refrigerant up to a certain depth from the liquid surface can only be effective for transfer of heat, and increasing the depth of the liquid more than such depth has no significance. Therefore, when it is desired to make ice in a larger scale, this should be achieved by increasing the length and width of the crystallization tank or by arranging a plurality of such crystallization tanks in juxtaposed relation.

At the outlet end of the crystallization tank 6 is provided a pump 7 for withdrawing the brine only from the bottom of said tank for recycling. By this pump 7, the hold-up of ice within the crystallization tank 6 is maintained below 10 percent and the hold-up of ice at the outlet end of said tank is maintained at 30 percent.

This brine circulating pump 7 is capable of recycling the brine to decrease the hold-up of ice within the crystallization tank and thereby to maintain the stirring effect of the refrigerant bubbles high on one hand, but on the other hand, has such disadvantage that the heat generated thereby degrades the operational efficiency of the process. However, the experiment and calculation conducted by the present inventors have revealed that the heat generated by the pump 7 is only slight and the provision of the pump 7 is far advantageous in consideration of its merit that the apparatus can be made compact as a whole.

As a result of experiment, it has been found that the flow state of the mixture is essentially the same as that of brine only when the hold-up of ice within the crystallization tank is up to about 20 percent but, when the hold-up of ice increases more than the amount specified, the mixture shows a phenomenon as if it has an increased viscosity and the mixing effect is degraded. Further, for the growth of ice crystals, it is necessary to mix the ice crystals with the brine with such force of mixing as will not cause destruction of the ice crystals, and therefore, the stirring force necessary for mixing must be increased when the hold-up of ice increases.

In the present invention, the brine circulating method is employed in consideration these points. According to the present invention, there is brought about, in addition to the advantages set forth above, such advantage that overcooling of the brine can be avoided and hence the quality of ice can be improved, by introducing the nuclei of ice, contained in the recycle of brine, into the inlet end of the crystallization tank.

The crystallization tank 6 is provided with a stirrer 10 at a location above the outlet port thereof, to prevent the accumulation of ice particles at that portion of the brine surface due to increasing hold-up of ice. This stirrer 10 is set such that it will be actuated only when the hold-up of ice sensed by an ice concentration senser 35 has increased above a certain level. The accumulation of ice at the outlet port and the operational failure of the apparatus can be prevented in the manner described above.

A slurry pump 9 is connected to a second contact of the senser 35 to be actuated thereby. Namely, the slurry pump 9 is actuated when the present of ice at the outlet end of the crystallization tank is sensed by the senser 35, and automatically deactuated when no ice is present at said portion.

The washing tower according to the present invention is provided with an auxiliary pump 12 and a senser 13. The auxiliary pump 12 is actuated when the ice is accumulated in the washing tower and the lower end of the ice bed thus formed reaches the position of the senser 13 (the lower end of the ice bed is normally maintained at a level slightly below brine drain holes 14 of the washing tower).

In the conventional processes, the brine pressure at the bottom of the washing tower is sensed and the auxiliary pump is actuated when the sensed brine pressure is higher than a predetermined value. However, according to the experiment, the lowering of the lower end of the ice bed in the washing tower 11 actually results in only a slight increase of the brine pressure at the bottom of said tower, and the precise control of brine pressure becomes necessary for the exact starting of the pump. For this reason, the senser 13 is provided in the present invention to sense the presence or absence of ice bed in the washing tower.

The brine withdrawn from the outlet port of the crystallization tank 6 by the auxiliary pump 12 is introduced into the bottom of the washing tower 11 and urges the ice bed in said washing tower upwardly while passing through said ice bed. Thus, a stable automatic operation of the washing tower can be ensured.

The brine flowing out of the washing tower 11 through the brine drain holes 14 is once accumulated in a brine box and then diverged into a return flow of brine to be returned to the inlet end of the crystallization tank 6 and a discharge flow of brine to be discharged to the outside of the system, without using a pump or the like. The amount of the discharge flow of brine is controlled depending on the amount of the production fresh water and is regulated such that it is about 1.5 times the amount of said production fresh water.

At the top end of the washing tower 11 is provided a scraper 15 having scraper blades 17, by which the ice stacked in the upper portion of said washing tower is scraped and dropped into a melting tank 18.

In this case, the fresh water produced by the apparatus itself is sprayed from above the top end of the washing tower by a sprayer 16 to wash off the brine attached to the surface of the ice particles and thereby to obtain fresh water of a salt concentration below the allowable limit.

It has been found that a sufficient washing effect can be obtained simply by dropping the washing water gravitationally each opening of the sprayer having a certain cross-sectional area and, for instance, the surface area of the ice of 100–150 $mm^2$ can be washed by the washing water dropping through a 6 mm diameter opening of the sprayer. Therefore, a sprayer 16 of the construction so simple as shown suffices the need. This is because the washing water dropped expands in the ice bed.

In the melting tank 18, the ice particles and the washing water entrained thereby are contacted by the refrigerant supplied from a compressor 19 which serves to suck the refrigerant evaporating in the crystallization tank 6 and pressurize the same. The refrigerant melts the ice particles floating in the liquid and concurrently is partially liquefied.

In the present invention, as described above, transfer of heat from the refrigerant to water and from the water to ice is effected by injecting the refrigerant vapour directly into the fresh water in which the ice particles are floating. In a process in which a refrigerant vapour is directly contacted with ice particles, heat transfer is impaired by the non-condensed gas retained in the ice particles, but according to the present invention the non-condensed gas is not allowed to reside in the water and, therefore, a large coefficient of heat-transfer can be maintained. For injecting the refrigerant vapour into the water in the melting tank, a high pressure is required and accordintly the load on the main compressor increases, but there are such advantages that the heat transfer in the melting tank is positive and that the scale up of the ice-making operation can be achieved with high exactitude. Moreover, the increase of the pressure ratio is only about 5 percent from 1.22 to 1.28.

After melting, the resultant fresh water and the refrigerant liquefied by condensation are led into a settling tank 23 and retained therein for 1 to 2 minutes.

The major portion of the fresh water is discharged as the product fresh water, while the remaining minor portion thereof is recycled for use as the washing water. The fresh water to be used as the washing water is led to the top end of the washing tower 11 by a pump 24. The amount of the fresh water discharged as the production fresh water can be made just equal to the amount produced in the apparatus, by controlling the interface of the fresh water and the refrigerant in the settling tank 23 to be maintained at a constant level. The feed brine can be introduced into the precoolers without using the pump, if the pressure in the melting tank and the liquid column are properly selected.

The liquid refrigerant returns to the crystallization tank as a free flow to replenish the refrigerant supplied to said tank from the auxiliary condenser, since the settling tank is at a higher level than the crystallization tank.

The brine discharged from the washing tower 11 and the production fresh water from the settling tank 23 are led into the brine precoolers 4 and 5, wherein they are used for the preliminary cooling of the feed brine and concurrently heated to a temperature near normal temperature. Even when the refrigerant is selected from those which are insoluble in brine or fresh water, the dissolution of a minute amount of the refrigerant in the brine or fresh water is inevitable. The amount of the refrigerant dissolving in the brine or fresh water becomes larger as its temperature becomes lower and its pressure becomes higher. Further, a more amount of the refrigerant dissolves in the brine than in the fresh water. Therefore, when the fresh water and the brine are heated to a temperature near normal temperature, the refrigerant dissolved therein is gasified but when they are heated to a higher temperautre, the amount of the dissolving refrigerant can be made extremely small. In this view, in the present invention the fresh water and the brine leaving the precoolers 4 and 5 are introduced into a deaerator 25 in which the high temperature, high pressure refrigerant from an auxiliary compressor 22 passes. This deaerator 25 is composed a plurality of ordinary wetted-wall type heat exchangers connected with each other and the interior thereof is divided by a partition wall of the character which does not pass liquid but passes vapour. The vapour generated in the precoolers 4 and 5 and the vapour generated in the deaerator 25 are recycled to the crystallization tank 6. Thus, it will be understood that the fresh water leaving the deaerator 25 contains substantially no refrigerant dissolved therein. This enables the subsequent treatment of the fresh water to be simplified and hence the production cost to be reduced. Namely, the final product of fresh water from the deaerator 25 by means of a pump 27 and passing it through an adsorber 28 packed with activated carbon.

On the other hand, the brine supplied to the deaerator 25 is withdrawn therefrom by means of a pump 26 and discarded to the sea. In this case, the brine is mixed with the brine from the auxiliary condenser 29 before it is discarded because, in general, the amount of the refrigerant dissolving in the brine becomes smaller as the salt concentration of the brine increases. The amount of refrigerant loss when the deaerator 25 is used is about 3 times as small as that when the deaerator is not used.

The refrigerant not liquefied in the melting tank 18 is pressurized by the auxiliary compressor 22 and introduced through the deaerator 25 into the auxiliary condenser 29 wherein it is liquefied by being cooled with the brine. The refrigerant vapour at the discharge port of the compressor 22 has a high temperature and the heat thereof is utilized in the deaerator 25 for removing the refrigerant dissolved in the fresh water and brine therefrom. This is advantageous in reducing the amount of brine required for cooling in the auxiliary condenser, since the heat load in the auxiliary condenser 29 is partially borne by the deaerator 25.

As described above, the horizontal crystallization tank, the horizontal melting tank arranged above said crystallization tank in juxtaposed relation and the washing tower connected to the ends of said tanks, which are the three major units of the apparatus of this invention, can be cooled a single cooling source. The temperature difference between the aforesaid units is less than 5°C. Therefore, it is only necessary to consider the thermal insulation of these units from the ambient air and the air space between the units has little influence on the cooling effect. Accordingly, the cooling cost can be minimized.

Further, the melting tank is arranged horizontally above the horizontal crystallization tank, and the washing tower is arranged vertically on one side of said tanks, extending over the total height of said tanks, whereby the brine discharged from said washing tower can be returned to the crystallization tank without using a pump, and the production fresh water and brine leaving from the melting tank can be led up to the deaerator 25 without using a pump and further the refrigerant in the melting tank 18 can be recycled to the crystallization tank without using a pump.

As may be clearly understood from the foregoing description, according to the present invention it is possible, owing to the provision of the baffle plates in the crystallization tank in the manner described herein, to create in said tank the condition in which the brine moves in the fashion of a piston flow and the ice particles move while being mixed with the brine in a state intermediate of piston flow and perfect mixing, and therefore, it is possible to discharge the ice particles, having grown to a certain size, from said tank faster than the brine.

Further, in the present invention the brine circulating method is employed, and the hold-up of ice is limited to less than 10 percent at the major portion of and to 20–30 percent at the outlet end of the crystallization tank. Therefore, the brine and ice particles can be stirred more effectively than in the conventional apparatus.

Still further, in the present invention the liquid and vapour are directly contacted with each other, so that positive melting of ice pieces and positive condensation of refrigerant can be ensured.

It is also a characteristic feature of the invention that a control method utilizing a unique sensor is employed for determining the proportion of ice to brine.

It is also an important feature of the invention that a deaerator is incorporated in the apparatus for removing the refrigerant from the fresh water and brine discharged from the precoolers, by heating said fresh water and brine with the high temperature refrigerant gas discharged from the auxiliary compressor.

Thus, according ot the present invention fresh water can be produced at a low cost from feed brine, simply by supplying an electric power to the apparatus, and moreover the water-making apparatus can be provided in a compact form.

We claim:

1. A process for making fresh water from brine, comprising
   subjecting the brine to deaeration,
   cooling the deaerated brine to a temperature of about 0°C,
   feeding the cooled brine to the inlet of a crystallization tank together with a brine recycling from the outlet of said crystallization tank,
   contacting the brine within said tank directly with a refrigerant to thereby form ice particles,
   introducing said ice particles into a washing tower wherein the ice particles are separated from the brine,
   passing said separated brine from the washing tower to the inlet of crystallization tank,
   introducing the washed ice particles into a melting tank to melt said ice into fresh water by direct contact with the refrigerant from said crystallization tank and which has been heated and pressurized by a compressor,
   separating the fresh water from the refrigerant in a settling tank,
   passing the fresh water through a deaerator,
   compressing the refrigerant, which has not been liquidized in the melting tank, in an auxiliary compressor,
   supplying the compressed refrigerant to said deaerator to simultaneously heat said deaerator and gasify within the deaerator the refrigerant dissolved in the water from said settling tank, and then returning the so-gasified refrigerant to said crystallization tank, and
   liquefying said compressed refrigerant.

* * * * *

UNITED STATES PATENT OFFICE
CERTIFICATE OF CORRECTION

Patent No. 3,803,860  Dated April 16, 1974

Inventor(s) Yoshinori NAGASHIMA; Keizo HAYASHI; Mamoru INOUE; Takai YAMAZAKI; Shinichi MAEDA; Shigetake KAWASAKI and Masaru OWA It is certified that error appears in the above-identified patent and that said Letters Patent are hereby corrected as shown below:

On the title page under item [73] add the following

Assignee:

AGENCY OF INDUSTRIAL SCIENCE AND TECHNOLOGY, Tokyo, Japan

Signed and sealed this 13th day of May 1975.

(SEAL)
Attest:

RUTH C. MASON
Attesting Officer

C. MARSHALL DANN
Commissioner of Patents
and Trademarks